H. DELANO.
Plow-Colter.
No. 2,529
Patented Apr. 1, 1842.
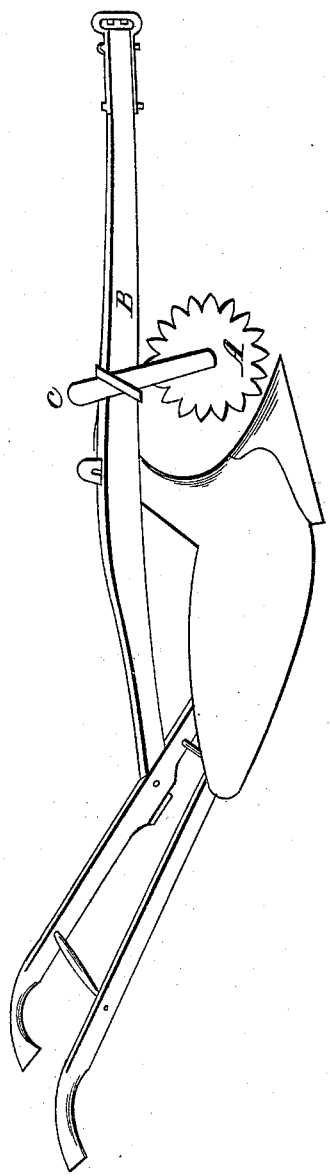

UNITED STATES PATENT OFFICE.

HOWARD DELANO, OF MOTTSVILLE, NEW YORK.

IMPROVEMENT IN THE MODE OF CONSTRUCTING A REVOLVING COLTER FOR PLOWS.

Specification forming part of Letters Patent No. 2,529, dated April 1, 1842.

*To all whom it may concern:*

Be it known that I, HOWARD DELANO, of Mottsville, in the county of Onondaga and State of New York, have invented an Improvement in the Manner of Constructing the Colter of a Plow, which improved colter I denominate the "Revolving Fleme or Toothed Colter;" and I do hereby declare that the following is a full and exact description thereof.

The accompanying drawing represents a plow with my colter attached thereto.

This colter consists of a serrated or toothed disk or plate, A, which is to be attached to the beam B by means of a bar of iron, C, on which it revolves. The bar C may be made adjustable by means of a staple and screw or by means of a wedge, in the ordinary way. The disk A is to be serrated or formed into large teeth on its edge, as shown in the drawing, and the teeth so formed around it are to be made sharp, so that they may cut the sward in grass, clover, grain, or other land.

My serrated or toothed colter may be made in various ways; but probably the best mode is to take a steel saw-plate of a suitable thickness. Such a plate, if thin, may be embraced between two flat disks of cast-iron, or it may have such a disk placed on one side of it and be attached to it by means of screws or rivets. Such a colter may also be made with small plates of steel, each forming one or two teeth only, in the manner of some circular saws, such teeth being attached to a flat disk of iron. Care must be taken to fit the separate pieces well together at their edges. They may be screwed onto the disk and may be separated and easily sharpened when necessary.

I am aware that revolving colters have been used with plows; but they have consisted of disks not serrated or toothed around their edges, in consequence of which their action has proved much less perfect and advantageous than that of my improved colter, in which the cutting-edges operate obliquely upon the sward or material to be cut, and in which, also, the toothed form insures its regular revolution by the motion of the plow. A plow furnished with this colter has been found to work more steadily and with a lighter draft than with any other known colter.

I do not claim a revolving colter which consists of a circular plate with a smooth cutting-edge, such having been previously known and used, but limit my claim to the foregoing improvement of forming sharp teeth or serratures around it.

What I claim as constituting my invention, and desire to secure by Letters Patent, is—

The combination and employment, with a plow, of a revolving colter, which is serrated or furnished with teeth around its periphery, so sharpened as to constitute cutting-edges and to operate substantially in the manner herein set forth.

HOWARD DELANO.

Witnesses:
  ANDREW BLODGETT,
  NEWMAN P. WHITE.